July 1, 1958 V. I. MEIER 2,840,873
QUICK RELEASE MECHANISM
Filed Dec. 22, 1953 2 Sheets-Sheet 1
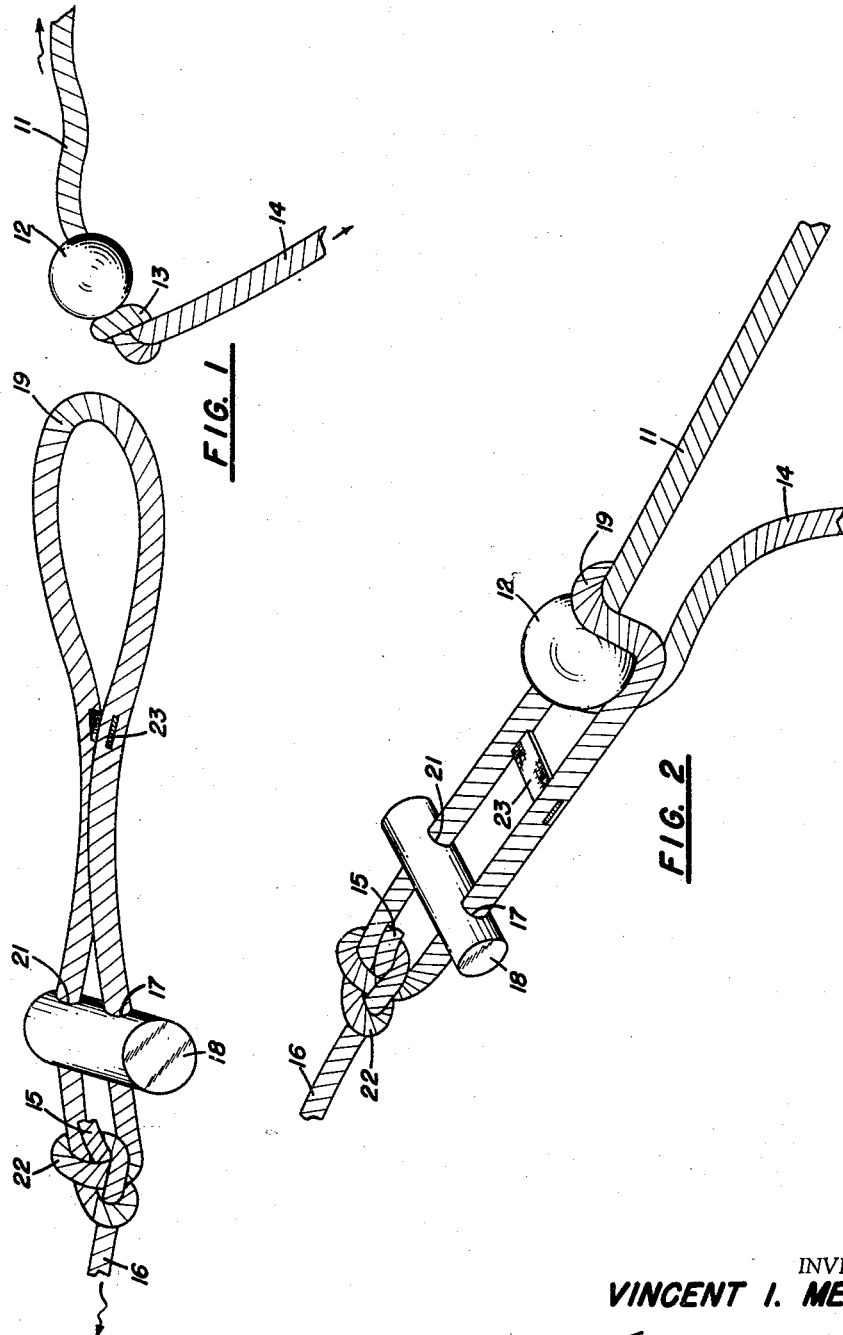
INVENTOR
VINCENT I. MEIER
ATTORNEYS July 1, 1958  V. I. MEIER  2,840,873
QUICK RELEASE MECHANISM
Filed Dec. 22, 1953  2 Sheets-Sheet 2
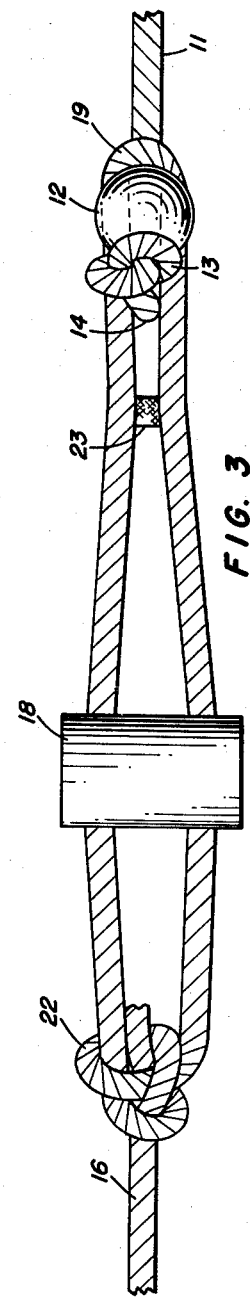
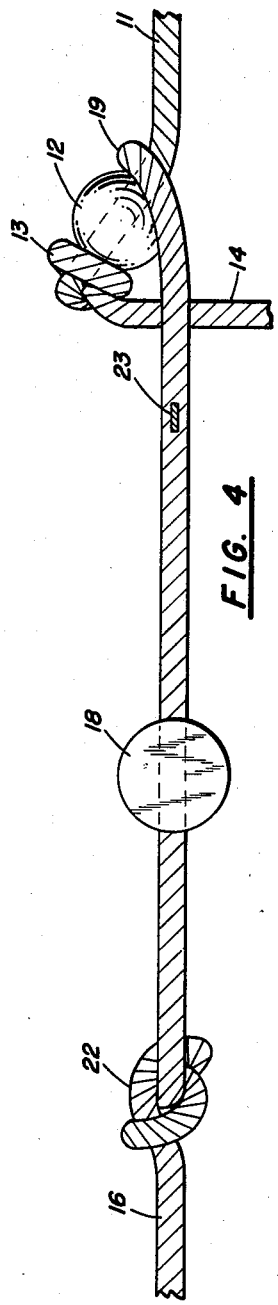
INVENTOR
VINCENT I. MEIER
BY R. J. Tompkins
ATTORNEYS United States Patent Office 2,840,873
Patented July 1, 1958

2,840,873

QUICK RELEASE MECHANISM

Vincent I. Meier, Port Washington, N. Y., assignor, by mesne assignments, to the United States of America as represented by the Secretary of the Navy Application December 22, 1953, Serial No. 399,840

4 Claims. (Cl. 24—123)

The present invention relates to a quick release mechanism for releasably securing two lines together and more particularly to a device for quickly releasing the lines which secure a cover or protector to the wing or tail surface of an aircraft.

Previous methods of releasably securing a pair of lines together involve the use of pelican hooks, knots, snap hooks and other similar devices, but all of the prior art devices have the common disadvantage that it is impossible to release more than one pair of lines by a single motion. A further shortcoming of the prior art devices is the increased difficulty of releasing them while a strain is applied to the lines.

According to the present invention a ball on one line is passed through a loop in the end of another line and held therein while the lines are lax or are under strain, but is readily releasable therefrom at any time by a single motion.

Another object is the provision of a quick release mechanism for joining a pair of lines which will not separate of its own accord in the absence of any strain on the lines.

A further object is the provision of a quick release mechanism for joining a pair of lines which is readily separable while the lines are under strain.

Other objects and many of the attendant advantages of this invention will be readily appreciated as the same becomes better understood by reference to the following detailed description when considered in connection with the accompanying sheet of drawings in which:

Fig. 1 is an isometric view of a pair of lines embodying the present invention in disassembled position.

Fig. 2 is a perspective view of the device of Fig. 1 in assembled position and under strain.

Fig. 3 illustrates a plan view of the present invention with the parts assembled but not under strain.

Fig. 4 shows a side elevation view of Fig. 3.

Referring more particularly to the drawings, the free end 14 of line 11 is threaded through a spherical ball 12 which is retained on the line 11 by knot 13. The free end 15 of a second line 16 is threaded through hole 17 in a distance piece 18, then bent back upon itself to form loop 19, threaded through hole 21 in the distance piece and seceurely knotted to line 16 as at 22. A yieldable member such as an elastic strip 23 is attached to opposite stretches of the loop 19 and tends to hold the loop closed as shown in Fig. 3.

In operation, the ball 12 is passed through loop 19 and is retained therein by the action of elastic cord 23 which, in the absence of any strain on lines 11 and 16, prevents loop 19 from opening and allowing ball 12 to slip therefrom as shown in Figs. 3 and 4. The free end 14 of line 11 is not threaded through loop 19, but instead, lies on the same side of the loop as line 11 in position to pull the ball back through the loop. When tension is exerted on the lines 11 and 16 the ball 12 is forced farther into the end of the loop until the loop bears tightly against the line 11 and the rear of the ball as shown in Fig. 2. At the same time, the distance piece tends to spread the stretches of the loop apart while tension on the stretches of the loop overcomes the tendency of the elastic cord to keep the loop closed. To free the lines 11 and 16, the free end 14 is jerked or pulled in a direction perpendicular to the lines, pulling the ball through and free of the loop. To facilitate separation of several pairs of lines simultaneously, the free ends (corresponding to free end 14) are all gripped and pulled together which will free all of the lines.

The ball 12 and distance piece 18 may be formed of any suitable material, such as wood, plastic or light metal, depending upon the specific application or use of the device. The use of a spherical ball is preferred because of the ease of entry and extraction from the loop, but any similar rounded protuberance or enlargement of the line, could be utilized with comparable success. According to the requirements of the specific application of the device, the spacing of the holes 17 and 21 in the distance piece, the degree of elasticity of the elastic cord 23, and the size of the ball 12 may all be varied to achieve virtually any combination of trip line pull versus securing line pull.

Obviously many modifications and variations of the present invention are possible in the light of the above teachings. It is therefore to be understood that within the scope of the appended claims the invention may be practiced otherwise than as specifically described.

What is claimed is:

1. A quick release mechanism for releasably securing two lines together comprising a line having a loop therein, said loop comprising a pair of stretches and a bight, rigid means slidably mounted on and spacing said stretches, elastic means having opposite ends thereof attached to said spaced stretches between said rigid means and said bight for resiliently urging said stretches together in the absence of any strain on said line, a second loop being defined by said elastic means, said stretches and said bight, a second line having a ball secured thereto intermediate the ends thereof, said ball being adapted to engage one side of said second loop and both ends of said second line being located on the other side of said second loop, said stretches being spaced a distance less than the diameter of said ball, whereby the elastic means retains the ball within said second loop when the lines are not under strain and whereby when tension is applied to the lines said rigid means holds said stretches of said second loop apart against the action of said elastic means to allow the ball to be pulled through said second loop by pulling on said one end of said second line to separate the lines.

2. A quick release mechanism for releasably securing two lines together comprising a spherical ball secured to one line short of the free end thereof; a loop having inner and outer ends formed in the free end of the second line; a distance piece near the inner end of said loop separating and spacing the stretches thereof apart; an elastic strip having opposite ends thereof attached to said spaced stretches of the second line near the outer end of the loop holding the stretches thereof resiliently urged together into ball retaining relation against the separating action of the distance piece; said stretches being spaced a distance less than the diameter of said ball; said ball being adapted to be passed through the outer end of said loop with the one line and its free end being on the same side of the loop; whereby the elastic strip retains the ball within the loop when the lines are not under strain and the distance piece holds the stretches of the loop apart against the action of the elastic strip when tension is applied to the lines, so that the ball may be pulled from the loop and the lines separated by pulling on the free end of the one line.

3. A quick release mechanism for releasably securing two lines together comprising a spherical ball secured to one line short of the free end thereof; a loop having inner and outer ends formed in the free end of the second line; a distance piece near the inner end of said loop separating and spacing the stretches thereof apart; a yieldable member having opposite ends thereof attached to said spaced stretches of the second line near the outer end of said loop holding the stretches thereof resiliently urged together; said stretches being spaced a distance less than the diameter of said ball; said ball being adapted to be passed through the outer end of said loop with the one line and its free end being on the same side of the loop, whereby the yieldable member retains the ball within the loop when the lines are not under strain and the distance piece holds the stretches of the loop apart against the action of said member when tension is applied to the lines, so that the ball may be pulled from the loop and the lines separated by pulling on the free end of the one line.

4. A quick release mechanism for releasably securing two lines together comprising a rounded protuberance on one line short of the free end thereof; a loop having inner and outer ends formed in the free end of the second line; a distance piece between and separating the stretches of the loop near the inner end thereof; a yieldable member having opposite ends thereof attached to said spaced stretches of the second line resiliently connecting the stretches of the loop near the outer end thereof; said stretches being spaced a distance less than the diameter of said protuberance; said protuberance being passed through the outer end of said loop with the line and its free end being on the same side of the loop; whereby the yieldable member tends to hold the loop closed into protuberance retaining relation against the separating action of the distance piece, to retain the protuberance within the loop when the lines are not under strain and the distance piece holds the stretches of the loop apart against the action of said member when the lines are tensioned, so that the protuberance may be pulled from the loop and the lines separated by pulling on the free end of the one line.

References Cited in the file of this patent

UNITED STATES PATENTS

| | | |
|---|---|---|
| 825,753 | Paul | July 10, 1906 |
| 852,180 | Hoffman | Apr. 30, 1907 |
| 1,386,052 | Duggan | Aug. 2, 1921 |
| 2,572,889 | Strykower | Oct. 30, 1951 |

FOREIGN PATENTS

| | | |
|---|---|---|
| 3,172 | Great Britain | Aug. 21, 1877 |
| 417,157 | Great Britain | Sept. 28, 1934 |
| 471,252 | France | Oct. 21, 1914 |